(12) United States Patent
Nishi et al.

(10) Patent No.: US 8,137,817 B2
(45) Date of Patent: Mar. 20, 2012

(54) POLYAMIDE BASED RESIN FILM ROLL AND A PROCESS FOR PRODUCING THE SAME

(75) Inventors: Tadashi Nishi, Inuyama (JP); Yoshinori Miyaguchi, Inuyama (JP); Naonobu Oda, Inuyama (JP); Shigeru Komeda, Osaka (JP); Katsuhiko Nose, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1217 days.

(21) Appl. No.: 11/628,034

(22) PCT Filed: Jun. 2, 2005

(86) PCT No.: PCT/JP2005/010185
§ 371 (c)(1),
(2), (4) Date: Mar. 1, 2007

(87) PCT Pub. No.: WO2005/118262
PCT Pub. Date: Dec. 15, 2005

(65) Prior Publication Data
US 2007/0259164 A1    Nov. 8, 2007

(30) Foreign Application Priority Data

Jun. 2, 2004 (JP) .................................. 2004-164971
Sep. 9, 2004 (JP) .................................. 2004-262922

(51) Int. Cl.
*B32B 27/06* (2006.01)
(52) U.S. Cl. ................ 428/474.4; 428/35.2; 264/173.19
(58) Field of Classification Search ................. 428/35.2, 428/474.4; 264/173.19
See application file for complete search history.

(56) References Cited

U.S. PATENT DOCUMENTS 5,741,601 A * 4/1998 Kishida et al. ............. 428/474.4

FOREIGN PATENT DOCUMENTS

| | | |
|---|---|---|
| EP | 0927624 | 7/1999 |
| EP | 927624 A2 * | 7/1999 |
| JP | 04-103335 | 4/1992 |
| JP | 07-0475454 | 2/1995 |
| JP | 07-290565 | 11/1995 |
| JP | 08-174663 | 7/1996 |
| JP | 08-197620 | 8/1996 |
| JP | 08-267569 | 10/1996 |
| JP | 08-309074 | 11/1996 |
| JP | 10-016047 | 1/1998 |
| JP | 10-044230 | 2/1998 |
| JP | 10-100226 | 4/1998 |
| JP | 2000-062019 | 2/2000 |
| JP | 2000-309074 A | 11/2000 |
| JP | 2001-239578 | 4/2001 |
| JP | 2002-029014 | 1/2002 |
| JP | 2003-170494 | 6/2003 |
| JP | 2004-181777 | 7/2004 |
| JP | 2004181777 A * | 7/2004 |
| JP | 3671978 | 7/2005 |

* cited by examiner

*Primary Examiner* — Leszek Kiliman
(74) *Attorney, Agent, or Firm* — Kenyon & Kenyon LLP

(57) ABSTRACT

A polyamide based resin film roll is provided. The polyamide based resin film roll comprising: a first sample cutout portion within 2 m from the winding end of film; and a final cutout portion within 2 m from the winding start of film, wherein when a sample cutout portion is set up in approximately every 100 m from the first sample cutout portion, in all samples cut out from each of the cutout portions, mechanical properties such as boiling water shrinkage percentage and refraction index in the thickness direction are adjusted within a given range of variation width.

25 Claims, No Drawings

POLYAMIDE BASED RESIN FILM ROLL AND A PROCESS FOR PRODUCING THE SAME

This is a 371 national phase application of PCT/JP2005/010185 filed Jun. 2, 2005, claiming priority to Japanese Patent Applications No. 2004-164971 filed Jun. 2, 2004, and No. 2004-262922 filed Sep. 9, 2004, the contents of which are incorporated herein by reference.

TECHNICAL FIELD

The present invention relates to a film roll having high quality and homogeneous mechanical properties over a long length by winding up a polyamide based resin film, and specifically, to a polyamide based resin film roll with excellent workability in use of packaging such as retort food by laminating with a polyolefin based resin film.

BACKGROUND ART

A biaxially oriented polyamide based resin film composed of nylon in major components is excellent in toughness, gas-barrier, pinhole resistance, transparency, printing property and the like, so that it is widely utilized as a packaging material in various kinds of foods such as a variety of liquid food, aqueous food, frozen food, retort food, paste food, cattle meat and aquatic food. Particularly in recent years, it is used extensively in packaging of retort food. Such polyamide based resin film is laminated with polyolefin based resin films such as polyethylene and polypropylene, folded in two parallel to its machine direction, then thermally adhered in three sides and cut to give a bag with one side opened and three edges sealed in an opened state, in which various kinds of food etc. are filled and sealed, then sterilized by heating in boiling water before being supplied to market.

In the case of using polyamide based resin film, however, there are some instances that warpage occurs at corners of packaging bag after heat sterilization treatment to yield a curling phenomenon of four sides in S-shape (hereinafter called S-shaped curl phenomenon), resulting in remarkable deterioration of appearance as packaging goods. Therefore, regarding a method of reducing such curl phenomenon, as shown in Patent reference 1, there has been proposed a method to adjust a biaxially oriented polyamide based resin film to a specified value of product of its boiling water shrinkage percentage and percentage change of molecular orientation angle in the direction of film width, but the method needs an extremely high temperature in thermal fixation or excess thermal relaxation after stretching to enhance dimensional stability in boiling water treatment, thus it poses problems that the toughness and pinhole resistance of the resultant film are deteriorated.

Therefore, the present inventors have devised and proposed a method for obtaining a biaxially oriented polyamide based resin film free from S-shaped curl phenomenon without lowering toughness and pinhole resistance by adjusting boiling water shrinkage percentage and refraction index of film within a specified numeric range as described in Patent reference 2.

Patent reference 1: Japanese Unexamined Patent Publication Hei 4-103335 (1992)

Patent reference 2: Japanese Unexamined Patent Publication Hei 8-174663 (1996)

DISCLOSURE OF THE INVENTION

Problems to be Solved by the Invention

According to the method of Patent reference 2 described above, it becomes possible to obtain a biaxially oriented polyamide based resin film free from S-shaped curl phenomenon having excellent toughness and pinhole resistance. However, in a bag forming processing by lamination, since conditions of pressure and time in thermal adhesion are finely adjusted for every film roll used, even in the case where the average values of boiling water shrinkage percentage and refraction index of the film wound up in a film roll are in the range of Patent reference 2, when degree of variation in one film roll is large, wrinkle takes place between films each other on lamination in a bag forming processing, which tends to pose troubles such as bad yield ratio.

On the other hand, the present inventors have proposed, in a production method of biaxially stretched film roll by winding up a biaxially stretched film after melt extrusion of a plurality of resins mixed, as a method to reduce variation of coefficient of dynamic friction, a method to reduce segregation of feedstock by homogenizing the shape of feedstock chip or enlarging the angle of slope of a funnel-shaped hopper as a feed section of feedstock into an extruder (Japanese Unexamined Patent Publication 2004-181777). However, the method also cannot necessarily be conclusive for a method to suppress the variation and fluctuation of mechanical properties such as boiling water shrinkage percentage and refraction index of film wound in a film roll.

The present invention has been achieved as a result of committed research and development on production techniques to produce a biaxially stretched film roll with high homogeneity, and the object is to solve the problems of conventional biaxially oriented polyamide based resin film roll, to provide a biaxially oriented polyamide based resin film roll capable of bag forming processing smoothly by lamination with almost no troubles to give a package free from S-shaped curl efficiently. Another object is to provide a biaxially oriented polyamide based resin film roll capable of obtaining a processed goods with high yield ratio in a post treatment like bag forming processing. In addition, another object is to provide a production method which can efficiently produce such a biaxially oriented polyamide based resin film roll.

Means to Solve the Problems

Of the present inventions, the constituent of the invention described in claim 1 is a film roll wound up of a polyamide based resin film in a width of 0.2 m (m is meter) or more, 3.0 m or less, and a length of 300 m or more, 30000 m or less, the polyamide based resin film roll comprising: setting up a first sample cutout portion within 2 m from the winding end of film; and a final cutout portion within 2 m from the winding start of film, wherein when a sample cutout portion is set up in approximately every 100 m from the first sample cutout portion, the following requirements are satisfied;

(1) when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage of the maximum boiling water shrinkage percentages is 3% to 6%, and a degree of variability in the maximum boiling water shrinkage percentages of all samples is within ±2% to ±10% relative to the average boiling water shrinkage percentage;

(2) when a directional difference of boiling water shrinkage percentage of each sample cut out from each of the cutout portions is measured, the directional difference of boiling water shrinkage percentage being the difference between a boiling water shrinkage percentage in the direction of +45° to the longitudinal direction and a boiling water shrinkage percentage in the direction of −45° to the longitudinal direction in an absolute value, an average directional difference of boiling water shrinkage percentage which is the average of the directional differences of boiling water shrinkage percentage is 1.5% or less, and a degree of variability in the directional differences of boiling water shrinkage percentage of all samples is within ±2% to ±10% relative to the average directional difference of boiling water shrinkage percentage;

(3) a degree of variability in the thickness of a roll wound up over the entire length in the longitudinal direction is within ±2% to ±10% relative to the average thickness.

The constituent of the invention described in claim 2 is, in the invention described in claim 1, the roll wherein when refraction index in the thick direction of each sample cut out from each of the cutout portions is measured, an average refraction index which is the average of the refraction indexes is 1.505 or more, 1.520 or less, and a degree of variability in the refraction indexes of all samples is within ±2% relative to the average refraction index.

The constituent of the invention described in claim 3 is, in the invention described in claim 1, the roll wherein when refraction index in the thickness direction of each sample cut out from each of the cutout portions is measured, an average refraction index which is the average of the refraction indexes is 1.505 or more, 1.520 or less, and a degree of variability in the refraction indexes of all samples is within ±1% relative to the average refraction index.

The constituent of the invention described in claim 4 is, in the invention described in claim 1, the roll wherein the major component of polyamide composing the polyamide based resin film is nylon 6.

The constituent of the invention described in claim 5 is, in the invention described in claim 1, the roll which is a polyamide based resin film wound up being formed from a mixture of two or more kinds of different polyamide resins.

The constituent of the invention described in claim 6 is, in the invention described in claim 1, the roll wherein the polyamide based resin film wound up is laminated with a polyolefin based resin film.

The constituent of the invention described in claim 7 is, in the invention described in claim 1, the roll which is a polyamide based resin film wound up wherein an unoriented sheet-like material obtained by extruding melted polyamide based resin from a T-die and cooling by contact with a metal roll is stretched biaxially.

The constituent of the invention described in claim 8 is, in the invention described in claim 1, the roll which is a polyamide based resin film wound up being stretched by a tenter stretching method.

The constituent of the invention described in claim 9 is, in the invention described in claim 1, the roll which is a polyamide based resin film wound up being sequentially biaxially stretched.

The constituent of the invention described in claim 10 is, in the invention described in claim 1, the roll which is a polyamide based resin film wound up being biaxially stretched in the longitudinal direction and the transverse direction.

The constituent of the invention described in claim 11 is, in the invention described in claim 1, the roll which is a polyamide based resin film wound up wherein an essentially unoriented sheet-like material of polyamide based resin is stretched in at least two stages in the longitudinal direction in threefold or more at a higher temperature than the glass transition temperature of the polyamide based resin plus 20° C., then stretched in the transverse direction in threefold or more.

The constituent of the invention described in claim 12 is, in the invention described in claim 1, the roll which is a polyamide based resin film wound up being thermally fixed after a final stretching treatment.

The constituent of the invention described in claim 13 is, in the invention described in claim 1, the roll which is a polyamide based resin film wound up being relaxed after thermal fixation.

The constituent of the invention described in claim 14 is, in the invention described in claim 1, the roll wherein at least one kind selected from the group consisting of lubricant, anti-blocking agent, thermal stabilizer, antioxidant, antistatic agent, light resistant agent and impact modifier is added to the polyamide based resin film wound up.

The constituent of the invention described in claim 15 is, in the invention described in claim 1, the roll wherein inorganic particle is added to the polyamide based resin film wound up.

The constituent of the invention described in claim 16 is, in the invention described in claim 1, the roll wherein the inorganic particle is a silica particle of 0.5-5.0 μm in an average diameter.

The constituent of the invention described in claim 17 is, in the invention described in claim 1, the roll wherein a higher fatty acid is added to the polyamide based resin film wound up.

The constituent of the invention described in claim 18 is a production method of polyamide based resin film roll comprising: a step of film forming while melt-extruding polyamide based resin chip; a step of biaxial stretching wherein an unstretched film obtained in the step of film forming is stretched biaxially in the longitudinal direction and the transverse direction; and a step of roll forming by winding up the biaxially stretched film, wherein the step of biaxial stretching includes a stretching in the transverse direction after a stretching in the longitudinal direction in two stages.

The constituent of the invention described in claim 19 is, in the invention described in claim 18, the method wherein the stretching ratio in the first stage of two-stage stretching in the longitudinal direction in the step of biaxial stretching is higher than the stretching ratio in the second stage.

The constituent of the invention described in claim 20 is, in the invention described in claim 18, the method wherein the step of film forming comprises melt extrusion after polyamide based resin chip with the largest amount used is mixed with one or more kinds of polyamide based resin chips different from the polyamide based resin chip in composition, wherein the shape of each polyamide based resin chip used is elliptic cylinder having elliptic cross section with a major axis and a minor axis, and polyamide based resin chip other than the polyamide based resin chip with the largest amount used is adjusted each in its average major axis, average minor axis and average chip length so as to be within a range of ±20% relative to the average major axis, average minor axis and average chip length of the polyamide based resin chip with the largest amount used.

The constituent of the invention described in claim 21 is, in the invention described in claim 18, the method which comprises a step of melt extrusion using an extruder equipped with a funnel-shaped hopper as a feed section of feedstock chip, wherein an angle of slope of the hopper is adjusted to 65° or more.

The constituent of the invention described in claim 22 is, in the invention described in claim 18, the method which comprises a step of melt extrusion using an extruder equipped with a funnel-shaped hopper as a feed section of feedstock chip, wherein a water content of polyamide based resin chip before being fed to the hopper is adjusted to 800 ppm or more, and 1000 ppm or less.

The constituent of the invention described in claim 23 is, in the invention described in claim 18, the method which comprises a step of melt extrusion using an extruder equipped with a funnel-shaped hopper as a feed section of feedstock chip, wherein a temperature of polyamide based resin chip before being fed to the hopper is adjusted to 80° C. or more.

The constituent of the invention described in claim 24 is, in the invention described in claim 18, the method wherein the step of film forming includes a cooling step of winding up melted resin extruded from an extruder on a cooling roll, wherein a part contacting the melted resin with the surface of cooling roll is sucked over the entire width of melted resin by a suction unit in the opposite direction to the winding up direction.

The constituent of the invention described in claim 25 is, in the invention described in claim 18, the method which comprises a step of preheating conducted before a step of longitudinal stretching and a step of thermal treatment conducted after the step of longitudinal stretching, wherein a variation width of surface temperature of film at any point of the step of longitudinal stretching, the step of preheating and the step of thermal treatment is adjusted over the entire film length within a range of ±1° C. to the average temperature Effect of the Invention Using the polyamide based film roll of the present invention, bag forming processing can be conducted smoothly by lamination with almost no troubles to give a package free from S-shaped curl efficiently. Also, it becomes possible to obtain a processed goods with high yield ratio in a post treatment like bag forming processing. In addition, in use of the polyamide based resin film roll of the present invention, a bag for food packaging after bag forming processing becomes excellent in toughness and pinhole resistance.

BEST MODE FOR CARRYING OUT THE INVENTION

When a maximum boiling water shrinkage percentage which is the maximum value of boiling water shrinkage percentages in all directions for all samples of a polyamide based film roll of the present invention is measured, in the case of cutting out a sample in a method described later, an average boiling water shrinkage percentage which is the average of the maximum boiling water shrinkage percentages is adjusted to be 3% or more and 6% or less.

Also, in the case of cutting out a sample in a method described later, when a directional difference of boiling water shrinkage percentage of a polyamide based film roll of the present invention is measured, the directional difference of boiling water shrinkage percentage being the difference between a boiling water shrinkage percentage in the direction of +45° to the longitudinal direction and a boiling water shrinkage percentage in the direction of −45° to the longitudinal direction for all samples in an absolute value, an average directional difference of boiling water shrinkage percentage which is the average of the directional differences of boiling water shrinkage percentage is adjusted to be 1.5% or less.

The cutout of sample in the present invention is first set up to be a first sample cutout portion within 2 m from the winding end of film and a final cutout portion within 2 m from the winding start of film, and a sample cutout portion is to be set up in approximately every 100 m from the first sample cutout portion. Additionally, "approximately every 100 m" means that a sample may be cut out in about 100 m±1 m.

The above-mentioned cutout of sample will be more specifically described as follows; for example, when a roll of polyamide based film is wound in a length of 498 m, a first sample (1) is cut out within 2 m from the winding end of film. Additionally, the cutout of sample is for convenience cut into a rectangle having a side along the longitudinal direction and a side perpendicular to the longitudinal direction (not to be cut out on a slant). Subsequently, a second sample (2) is cut out in a part 100 m apart toward the winding start side from the part cut out. Similarly a third sample (3) in apart 200 m apart toward the winding start side, a fourth sample (4) in a part 300 m apart toward the winding start side, and a fifth sample (5) in a part 400 m apart toward the winding start side are cut out. When samples are cut out in this way, the rest becomes shorter than 100 m, thus a sixth (final) sample (6) is cut out in any part within 2 m from winding start of film. Then the following values of each sample cut out are measured in the following methods. They are, boiling water shrinkage percentage (hereinafter called BS), maximum boiling water shrinkage percentage (hereinafter called BSx), average boiling water shrinkage percentage (hereinafter called BSax), directional difference of boiling water shrinkage percentage (hereinafter called BSd) and average directional difference of boiling water shrinkage percentage (hereinafter called BSad).

[Measuring Methods of Boiling Water Shrinkage Percentage (BS), Maximum Boiling Water Shrinkage Percentage (BSx), Average Boiling Water Shrinkage Percentage (BSax), Directional Difference of Boiling Water Shrinkage Percentage (BSd) and Average Directional Difference of Boiling Water Shrinkage Percentage (BSad)]

A biaxially oriented polyamide based resin film cut out from each of cutout portions of polyamide based resin film roll is cut out into a square, allowed to stand in an atmosphere of 23° C. and 65% RH for 2 hours and more. A circle centered on this sample (about 20 cm in diameter) is drawn, a longitudinal direction (direction of film drawn out) is set to be 0°, liner lines passing to the center of circle are clockwise drawn at intervals of 15° in the direction of 0 to 165°, diameter in each direction is measured as the length before treatment. Then, after the sample cut out is thermally treated in boiling water for 30 minutes, it is brought back and water attached on its surface is wiped out, dried in air, allowed to stand in an atmosphere of 23° C. and 65% RH for 2 hours or more, the length of linear line drawn to each diametrical direction is measured as the length after treatment as described above. Then, according to the following formulas 1 to 5, the following values are measured, which are, a BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

BS=[(length before treatment−length after treatment)/length before treatment]×100(%)   1

BSx=maximum shrinkage percentage (%) of values measured in 0 to 165° directions at intervals of 15°   2

BSax=summation of BSx's of all samples/number of samples   3

BSd=|(BS in 45° direction)−(BS in 135° direction)|   4

BSad=summation of BSd's of all samples/number of samples   5

Additionally, BSx value of polyamide film composing a polyamide based film roll is important from the points for enhancing toughness and pinhole resistance of film itself as well as for maintaining thermal resistance in hot-water treatment for biaxially oriented polyamide based resin film being formed in a bag-shape (it is called laminate strength or heat-resistant laminate strength). When BSx value is less than 3%, toughness and pinhole resistance become insufficient, whereas when more than 6%, lamination becomes poor, heat-resistant laminate strength in hot-water treatment becomes insufficient, which is not preferable. Preferable range of BSx is 3.5-5.0% for enhancing toughness, pinhole resistance, lamination property and heat-resistant laminate strength.

Also, BSd value of polyamide film composing a polyamide based film roll greatly affects a curl phenomenon occurring in boiling water treatment. That is, the larger the BSd, the more easily a bag is warped into a notable curl. However, when BSd is suppressed to 1.5% or less, preferably 1.2% or less, warpage of bag in boiling water treatment can be remarkably suppressed, which can prevent the occurrence of S-shaped curl phenomenon.

Also, for a polyamide based film roll of the present invention, it is necessary that a degree of variability in the maximum boiling water shrinkage percentage (BSx) of all samples cut out is adjusted within ±2% to ±10% (±2% or more and ±10% or less) relative to the average boiling water shrinkage percentage (BSa). Here, a degree of variability in the maximum boiling water shrinkage percentages (BSx) of all samples means, when the maximum and the minimum in the maximum boiling water shrinkage percentages (BSx) of all samples are obtained, from which a larger value of the difference between either the maximum or the minimum and the average boiling water shrinkage is obtained, a ratio of which relative to the average boiling water shrinkage percentage.

Namely, in a polyamide based film roll of the present invention, when boiling water shrinkage percentage of samples (1) through (6) is denoted as Xn (n=1 to 6), both the difference between Xmax, the maximum value of Xn and average boiling water shrinkage percentage (BSax) and the difference between Xmin, the minimum value and average boiling water shrinkage percentage (BSax) are required to be within ±10%. In other words, |BSax −Xn| (additionally | | indicates absolute value) are all required to be 10% or less.

Additionally, in a polyamide based film roll of the present invention, a degree of variability in the maximum boiling water shrinkage percentages (BSx) of all samples cut out is preferably within ±9% relative to the average boiling water shrinkage percentage (BSa), more preferably within ±8%, and further preferably within ±7%.

In addition, in a polyamide based film roll of the present invention, a lower degree of variability in the maximum boiling water shrinkage percentages (BSx) of all samples cut out is preferable, but we are considering that the lower limit of the degree of variability is limited to about 2% from the consideration of precision in the measurement.

Also, for a polyamide based film roll of the present invention, a degree of variability in the directional differences of boiling water shrinkage percentages (BSd) of all samples cut out is required to be adjusted within ±2% to ±10% (±2% or more and ±10% or less) relative to the average directional difference of boiling water shrinkage percentage (BSad). Here, a degree of variability in the directional differences of boiling water shrinkage percentages (BSd) of all samples means, when the maximum and the minimum in the directional differences of boiling water shrinkage percentages (BSd) of all samples are obtained, from which a larger value of the difference between either the maximum or the minimum and the average directional difference of boiling water shrinkage is obtained, a ratio of which to the average boiling water shrinkage percentage.

Namely, in a polyamide based film roll of the present invention, when directional difference of boiling water shrinkage percentage of samples (1) through (6) is denoted as Yn (n=1 to 6), both the difference between Ymax, the maximum value of Yn and average directional difference of boiling water shrinkage percentage (BSad) and the difference between Ymin, the minimum value and average directional difference of boiling water shrinkage percentage (BSad) are required to be within ±10%, in other words, |BSad −Yn| (additionally | | indicates absolute value) are all required to be 10% or less.

Additionally, in a polyamide based film roll of the present invention, a degree of variability in the directional differences of boiling water shrinkage percentage (BSd) of all samples cut out is preferably within ±9% relative to the average directional difference of boiling water shrinkage percentage (BSad), more preferably within ±8%, and further preferably within ±7%.

In addition, in a polyamide based film roll of the present invention, a lower degree of variability in the directional differences of boiling water shrinkage percentage (BSd) of all samples cut out is preferable, but we are considering that the lower limit of the degree of variability is limited to about 2% from the consideration of precision in the measurement.

Also, in a polyamide based film roll of the present invention, a degree of variability in thickness over the entire length in the longitudinal direction is required to be adjusted within ±2% to ±10% (±2% or more and ±10% or less) relative to the average thickness. Here, a degree of variability in thickness over the entire length in the longitudinal direction means, when the maximum and the minimum in the thickness over the entire length in the longitudinal direction of all samples are obtained, from which a larger value of the difference between either the maximum or the minimum and the average thickness is obtained, a ratio of which to the average thickness.

Namely, in a polyamide based film roll of the present invention, both the difference between Tmax, the maximum value in thickness over the entire length in the longitudinal direction and the average thickness (Ta, average thickness over the entire length in the longitudinal direction) and the difference between Tmin, the minimum value and the average thickness (Ta) are required to be within ±10%.

Additionally, in a polyamide based film roll of the present invention, a degree of variability in thickness over the entire length in the longitudinal direction is preferably within ±8% relative to the average thickness (Ta), more preferably within ±6%.

In addition, in a polyamide based film roll of the present invention, a lower degree of variability in thickness over the entire length in the longitudinal direction is preferable, but we are considering that the lower limit of the degree of variability is limited to about 2% from the performance of film forming apparatus.

In addition, in a polyamide based film roll of the present invention, in the case where a sample is cut out in the foregoing method, when refraction index (Nz) in the thickness direction of all samples are measured, an average refraction index (Nza) which is the average of the refractive indexes is preferably adjusted to be 1.505 or more, 1.520 or less. Additionally, the average refraction index is calculated by the following formula 6.

$$Nza = \text{summation of Nz's of all samples/number of samples} \qquad 6$$

Additionally, Nz value of polyamide film composing polyamide based film roll greatly affects film grade such as laminate strength and thickness irregularity. Thus, the requirement of average refraction index of 1.505 or more and 1.520 or less is an essential requirement in use of biaxially oriented polyamide based resin film laminated with a polyolefin based resin film. When Nz is less than 1.505, laminate strength with a polyolefin based resin film etc. becomes insufficient, which tends to cause peeling between the film and laminated substrate in boiling water treatment after bag forming. Moreover, the Nz is lowered sequentially in a process of biaxial stretching of unstretched polyamide based resin film. In other words, Nz is thought to be an index of stretching, larger Nz indicates insufficient stretching, thus a film with Nz of more than 1.520 remarkably displays thickness irregularity due to insufficient stretching, giving an unsatisfactory film grade. Particularly preferable range of Nz is in a range of 1.507 to 1.516 from the considerations of both laminate strength and film grade.

Also, in a polyamide based film roll of the present invention, a degree of variability in the refraction index (Nz) of all samples cut out is preferably adjusted within ±2% relative to the average of refraction indexes (hereinafter called an average refraction index). Here, a degree of variability in the refraction index (Nz) of all samples means, when the maximum and the minimum in the refraction index (Nz) of all samples are obtained, from which a larger value of the difference between either the maximum or the minimum and the average refraction index is obtained, a ratio of which to the average refraction.

Namely, in a polyamide based film roll of the present invention, when refraction index of samples (1) through (6) is denoted as Nz1 to Nz6, both the difference between Nzmax, the maximum value of Nz1 to Nz6 and the average refraction index, and the difference between Nzmin, the minimum value of Nz1 to Nz6 and the average refraction index are preferably within ±2%, in other words, all of |average refraction index −Nz1| to |average refraction index −Nz6| are preferably 2% or less. Also, in a polyamide based film roll of the present invention, a degree of variability in the refraction index (Nz) of all samples cut out is more preferably within ±1% relative to the average refraction index.

In addition, in a polyamide based film roll of the present invention, a lower degree of variability in the refraction index (Nz) of all samples cut out is preferable, but we are considering that the lower limit of the degree of variability is limited to about 0.1% from the considerations of precision in the measurement and precision of machine.

As described above, by adjusting the maximum boiling water shrinkage percentage and directional difference of boiling water shrinkage percentage within given range values, and also by lowering the degree of variability in the maximum boiling water shrinkage percentage and directional difference of boiling water shrinkage percentage in one polyamide based film roll, it becomes possible to prevent appearance deterioration in bag forming processing and lamination processing, to conduct smooth processing with good yield ratio.

As a polyamide resin used in the present invention, for example, there can be listed nylon 6 of ε-caprolactam as a major raw material. Also, as other polyamide resins, there can be listed a polyamide resin obtained by polycondensation of lactam with three-membered ring or more, ω-amino acid, dicarboxylic acid and diamine. Specifically, lactams include enantlactam, capryllactam, lauryllactam other than ε-caprolactam above-mentioned; ω-amino acids include 6-aminocaproic acid, 7-aminoheptanoic acid, 9-aminononanoic and 11-aminoundecanoic acid. Also, dicarboxylic acids include adipic acid, glutaric acid, pimelic acid, suberic acid, azelaic acid, sebacic acid, undecanedione acid, dodecadione acid, hexadecadione acid, eicosandione acid, eicosadienedione acid, 2,2,4-trimethyladipic acid, terephtahlic acid, isophthalic acid, 2,6-naphtahalene dicarboxylic acid, and xylylenedicarboxylic acid. Further, diamines include ethylenediamine, trimethylenediamine, tetramethylenediamine, hexamethylenediamine, pentamethylenediamine, undecamethylenediamine, 2,2,4 (or, 2,4,4)-trimethylhexamethylenediamine, cyclohexanediamine, bis-(4,4'-aminocyclohexyl) methane, and methaxylylenediamine. Polymers obtained by polycondensation of these chemicals and copolymers thereof, for example, nylons 6, 7, 11, 12, 6.6, 6.9, 6.11, 6.12, 6T, 6I, MXD6 (methaxyleneadipamide 6), 6/6.6, 6/12, 6/6T, 6/6I, 6/MXD6 can be used. In addition, in the case of producing polyamide film roll of the present invention, the above polyamide resin can be used alone or in a mixture of 2 kinds or more thereof.

Additionally, of the above polyamide based resins, particularly preferable resin in the present invention has relative viscosity in a range of 2.0 to 3.5. The relative viscosity of polyamide based resin affects toughness of biaxially stretched film obtained and stretching property. That is, when relative viscosity is less than 2.0, impact strength becomes somewhat insufficient, whereas when relative viscosity is more than 3.5, sequentially biaxially stretching property tends to be bad because of increase in stretching stress. Additionally, the relative viscosity in the present invention means a value that a solution of 0.5 g of polymer dissolved in 50 ml of 97.5% sulfuric acid is measured at 25° C.

Next, a preferable production method for obtaining a polyamide based resin film roll of the present invention will be described. The polyamide based resin film roll of the present invention is produced as follows: an unstretched film obtained by melt extrusion of polyamide resin chip of raw material is stretched biaxially in the longitudinal direction (length direction) and transverse direction (width direction) and wound up in a roll.

The present inventors have studied on thickness irregularity of film roll in the longitudinal direction (thickness irregularity over the entire length of film roll), and variation and fluctuation of physical properties like boiling water shrinkage percentage, as a result, it has been found that the thickness irregularity in the longitudinal direction, and variation and fluctuation of the physical properties are largely influenced by various factors mainly in a casting step of melted resin into an unstretched film. Namely when a resin fed into a funnel-shaped hopper (hereinafter simply called hopper) connected directly with an extruder has a low temperature, or a resin fed into a hopper has a high water content, thickness irregularity of the unstretched film in the longitudinal direction becomes large, and variation and fluctuation of the physical properties of the biaxially stretched film become large. It has been also found that thickness irregularity of the unstretched film in the longitudinal direction becomes large and variation and fluctuation of the physical properties of the biaxially stretched film become large when contact point between the resin and a metal roll is in turbulence in winding resin extruded from a T-die on the metal roll. Further, it has been found that when stretching conditions are not suitable in a step of biaxial stretching, thickness irregularity of the unstretched film in the longitudinal direction is amplified, increasing variation and fluctuation of the physical properties.

Further, the present inventors have keenly studied on the basis of the foregoing facts. As a result, they learned that in producing a film roll, a film roll with less variation of physical properties can be obtained by the following measures:

(1) uniformity of shape of resin chip
(2) suitable shape of hopper
(3) reduction of water content in drying resin chip
(4) retention of temperature in feeding resin to hopper
(5) suction for contacting melted resin with metal roll
(6) suitable stretching condition Each of the above measures will be sequentially described below.

(1) Uniformity of Shape of Resin Chip

In the production of film roll of the present invention, in the case of adopting a blend method, a plurality of polyamide resin chips of raw materials different in composition are blended in a hopper, then melt blended and extruded from an extruder to form a film. For example, in the case of three kinds of polyamides as feedstock, respective polyamide resin chips are fed into respective three hoppers continuously or intermittently, via a buffer hopper if necessary, and finally while three kinds of polyamide resin chips are being mixed in a hopper just before or just above an extruder (hereinafter called final hopper), feedstock chips are quantitatively fed into the extruder in accordance with the extrusion rate of extruder to form a film.

However, depending on a capacity or shape of final hopper, when the amount of chip in the final hopper is large or when the amount of chip in the final hopper becomes small, there occurs a phenomenon of feedstock segregation, namely, a phenomenon in which chip composition fed to an extruder from the final hopper becomes uneven. Also, such segregation phenomenon appears remarkably, in particular when chip shape or specific gravity is different. Further, resulting from such segregation phenomenon, in the case of producing a long film, there occur the variations of maximum boiling water shrinkage, directional difference of boiling water shrinkage, film thickness and refraction index in the thickness direction.

Namely, in the presence of different chip sizes, when a mixture of chips falls in a final hopper, smaller chip is apt to fall first, when the remaining amount of chip in the final hopper becomes small, the ratio of larger chip becomes more, which causes the chip segregation. Therefore, in order to obtain a film with less variation of physical properties, it is necessary to uniform the shape of polyamide resin chip with a plurality of kinds being used to suppress a phenomenon of feedstock segregation in the final hopper.

Feedstock chip of polyamide is generally formed by being drawn off in a strand of melted state from polymerization equipment after polymerization, immediately water-cooled, and then cut by a strand cutter. Thus, polyamide chip is of elliptic cylinder with elliptic cross section. As the result of studies on the relationship between shape of polymer chip and feedstock segregation, an average major axis (mm), average minor axis (mm) of elliptic cross section and average chip length (mm) of polyamide chip mixed other than a polyamide chip with the largest amount used is adjusted each within a range of ±20% relative to the average major axis (mm), average minor axis (mm) of elliptic cross section and average chip length (mm) of the polyamide chip with the largest amount used, thereby it becomes possible to reduce the above-mentioned feedstock segregation. Additionally, it is more preferable, to result in a remarkable segregation preventing effect, that an average major axis, average minor axis of elliptic cross section and average chip length of polyamide chip mixed other than a polyamide chip with the largest amount used is adjusted each within a range of ±15% relative to the average major axis, average minor axis of elliptic cross section and average chip length of the polyamide chip with the largest amount used.

(2) Suitable Shape of Hopper

It is effective for reducing feedstock segregation that using a funnel-shaped hopper as a final hopper whose angle of slope is set to 65° or more, thereby large chip can fall easily in the same manner as small chip, and the upper part of contents goes down while keeping its horizontal plane. More preferable angle of slope is 70° or more. Additionally, angle of slope of hopper means an angle between oblique line of hopper and horizontal line segment. A plurality of hoppers may be used in the upstream of final hopper, in this case, any hopper must have an angle of slope of 65° or more, 70° or more is more preferable.

Also, reducing the ratio of fine powder formed due to shaving feedstock chip used is preferable to suppress the variation of boiling water shrinkage percentage. Since the fine powder advances feedstock segregation, it is preferable to eliminate fine powder formed in process to reduce the ratio of fine powder contained in a hopper. The ratio of fine powder contained is preferably within 1% by weight through the entire steps before feedstock chip enters into an extruder, more preferably within 0.5% by weight. As a specific method for reducing the ratio of fine powder, there can be listed a method of sieving in chip forming step by a strand cutter or passing through a cyclone type air filter in transporting feedstock chip with air.

In addition, as a means for reducing feedstock segregation in a hopper, setting a suitable capacity of hopper used is also a preferable means. Here, the suitable capacity of hopper is in a range of 15-120% by weight relative to the extrusion amount per one hour of extruder, more preferable is in a range of 20-100% by weight relative to the extrusion amount per one hour of extruder.

As a method for blending feedstock chips of polyamide having two or more kinds different in composition, the most preferable method is to blend in a hopper (final hopper) just above an extruder while quantitatively feeding each feedstock into the extruder continuously. Also, it is possible to feed into a final hopper and extruder via several intermediate hoppers (buffer hoppers) after premixing feedstock chip whose size is controlled within the range described above. In blending a plurality of feedstock, there can be listed a method of blending while feeding a plurality of feedstock quantitatively into a hopper from an apparatus quantitatively feeding feedstock chip continuously, or a method of blending beforehand using a blender or a paddle drier, in the case of adopting the latter, it is preferable to make the size of feedstock chip small not to generate feedstock segregation in discharging a mixture.

(3) Reduction of Water Content in Drying Resin Chip

Chip fed into a hopper is generally heated by a machine like blender to reduce moisture therein. In drying the chip, it has been thought that the lower content in drying in production of polyester film roll or polypropylene film roll generally yields the better film roll due to suppression of hydrolysis in an extrusion step. However, the following fact has been found from the result of the studies by the present inventors: in production of polyamide based resin film roll, a mere reduction of water content in drying makes stretching difficult to yield no film roll of homogeneous physical properties, but the water content is controlled within a given range to reserve some level of moisture, which leads to a suitable plasticization without being hydrolyzed in an extrusion step to thereby give a film roll with homogeneous physical properties. Namely, to obtain the film roll of the present invention, it is necessary to control the water content of chip in 800 ppm or more, and 1000 ppm or less. When the water content of chip exceeds 1000 ppm, hydrolysis is advanced when melted, which lowers viscosity. Therefore, thickness irregularity of unstretched film in the longitudinal direction becomes bad and the thickness irregularity of biaxially stretched film in the longitudinal direction is increased, which causes the variation and fluctuation of physical properties. On the other hand, when the water content of chip is less than 800 ppm, viscosity when melted becomes too high, which deteriorates film forming property (ease of stretching). Additionally, most suitable water content of chip fed to a hopper is 850 ppm or more, and 950 ppm or less.

(4) Retention of Temperature in Feeding Resin to Hopper

As described above, even in the case of adjusting water content of chip to 800 ppm or more, and 1000 ppm or less, a film roll with homogeneous physical properties cannot be obtained when chip after heat-drying being allowed to stand down to ambient (room) temperature is fed into a hopper. Namely, to obtain a film roll of the present invention, it is necessary to feed into a hopper while keeping the chip heat-dried by a blender etc. in high temperature. Specifically, it is necessary to feed into a hopper while keeping the chip heat-dried by a blender at 80° C. or more, it is more preferably to feed into a hopper while keeping at 90° C. or more. When the temperature of chip fed to a hopper is below 80° C., resin charging becomes bad. This causes thickness irregularity in the longitudinal direction, and variation and fluctuation of physical properties, which produces no film roll of the present invention. Additionally, in drying chip by a blender etc., drying temperature is required at 150° C. or less. When the drying temperature is above 150° C., it is not preferable because hydrolysis may occur in drying. Also, when the temperature of chip heat-dried by a blender is below 80° C., it is necessary to reheat the chip so as to be 80° C. or more before feeding it into a hopper.

(5) Suction for Contacting Melted Resin with Metal Roll

In obtaining an unstretched film by melt extrusion of chip, chip is melted by an extruder at 200-300° C., and extruded through a T-die to form a film (sheet), i.e., by casting, then quenched by a method of winding on a cooling roll such as metal roll being cooled at a given temperature. Additionally, from the points of thickness irregularity in the longitudinal direction, and variation and fluctuation of physical properties, preferable temperature of melt extrusion is 240° C. to 290° C. To obtain a film roll of the present invention, in the case of winding melted resin on a metal roll, it is preferable to force the melted resin to contact a metal roll by the following manner: air gap (namely, a distance between the exit of T-die lip and a surface of chilling roll in the vertical direction) is adjusted to 20-60 mm, and the part contacting the melted resin with the surface of cooling roll is sucked over the entire width of melted resin in the opposite direction to the winding direction by utilizing a suction unit such as vacuum box (vacuum chamber) having a wide suction inlet. Also, in this case, wind velocity of suction air in the suction inlet must be adjusted to 2.0-7.0 m/sec., and it is more preferably adjusted to 2.5-5.5 m/sec. Further, vacuum box may have a single suction inlet, and it is preferable that the suction inlet divided into a predetermined number of sections in the lateral direction can adjust the wind velocity of suction in each section to make the adjustment of wind velocity of suction easy in the suction inlet. Also, when the casting speed increases, accompanying stream takes place according to the rotation of metal roll, which disturbs close contact of melted resin with a metal roll, thus to make suction more effective by a suction unit, and to improve close contact of melted resin with the metal roll, it is preferable to shield the accompanying stream by equipping a masking shield of flexible material like Teflon being formed in broad range in the upstream adjacent to the suction unit (the opposite side to the rotation direction of metal roll relative to the suction unit). Further, to obtain a film roll of the present invention, fluctuation of wind velocity of suction (set value) in a vacuum box is required to be suppressed within ±20% to the average wind velocity of suction, more preferably suppressed within ±10%. In addition, to prevent wind velocity of suction in a vacuum box from variation due to oligomer dust etc., it is preferable to control suction power by equipping a filter in a vacuum box and feed back the differential pressure across the filter.

Also, to obtain a film roll of the present invention, in the case of winding melted resin on a cooling roll, it is necessary to quench continuously by close contact on the metal roll while glow discharging by impressing the melted resin sheet with a needle electrode in a direct current negative charge of 90-105 mA at 2-15 kv. Additionally, in this case, it is preferable to adjust the direct current negative charge impressed in a range of 7-14 kv because thickness irregularity in the longitudinal direction, and variation and fluctuation of physical properties are lowered. Also, to obtain a film roll of the present invention, the fluctuation of direct current negative charge impressed must be suppressed within ±20% to the average negative charge (set value), it is more preferably suppressed within ±10%.

(6) Suitable Stretching Condition

As a method of biaxially stretching an unstretched film, it is necessary to adopt a longitudinal and transverse stretching method that an unstretched film is stretched by a roll-type stretching machine in the longitudinal direction, stretched by a tenter-type stretching machine in the transverse direction, then thermally fixed and relaxed. Further, to obtain a film roll of the present invention, as a method of biaxial stretching, it needs to adopt so called longitudinal-longitudinal-transverse stretching method. Such the longitudinal-longitudinal-transverse stretching method is the following method: in longitudinal-stretching of an essentially unoriented polyamide film, the first-stage stretching is conducted, without cooling at Tg or less, and continuously the second-stage stretching is conducted, and then transverse stretching is conducted in a ratio of 3.0 times or more, preferable 3.5 times or more, and further thermally fixed. Moreover, to obtain a film roll of the present invention, in conducting the longitudinal-longitudinal-transverse stretching described above, a longitudinal stretching ratio in the first stage must be higher than a longitudinal stretching ratio in the second stage. Namely, by setting a longitudinal stretching ratio in the first stage higher than a longitudinal stretching ratio in the second stage, it becomes possible to obtain a film roll having excellent physical properties such as boiling water shrinkage percentage and less fluctuation of these physical properties. Additionally, in the case of conducting the longitudinal-longitudinal-transverse stretching, generally, when a longitudinal stretching ratio in the first stage is lower than a longitudinal stretching ratio in the second stage, stretching is easily carried out without adhesion on a roll in the first stage. On the other hand, even when a longitudinal stretching ratio in the first stage is higher than a longitudinal stretching ratio in the second stage, stretching can be easily carried out without adhesion on a roll by using a special roll such as roll made of Teflon (trademark).

In the case of conducting the longitudinal-longitudinal-transverse stretching described above, it is preferable that a longitudinal stretching in the first stage is carried out in a temperature of 80-90° C. and a ratio of about 2.0-2.4 times. It is not preferable that the stretching ratio in the first stage is high beyond the foregoing range because thickness irregularity in the longitudinal direction becomes large. In addition thereto, it is preferable that a longitudinal stretching in the second stage is carried out in a temperature of 65-75° C. and a ratio of about 1.3-1.7 times. It is not preferable that the stretching ratio in the second stage is low beyond the foregoing range because distortion in boiling is too large to have a practical use. Reversely, it is not preferable that the stretching ratio in the second stage is high beyond the foregoing range because strength (strength at 5% extension) in the longitudinal direction is too low to have a practical use.

Also, in the case of conducting the longitudinal-longitudinal-transverse stretching described above, a longitudinal stretching method can employ a heated roll stretching or an infrared radiation stretching. Also, in the case where a polyamide based resin film is produced by such longitudinal-longitudinal-transverse stretching method, it is possible to reduce not only thickness irregularity, the variation and fluctuation of physical properties in the longitudinal direction but also the variation and fluctuation of physical properties in the transverse direction. Also, in the case of conducting the longitudinal-longitudinal-transverse stretching, the total longitudinal stretching condition is preferably 3.0 to 4.5 times.

Also, in the case of conducting the longitudinal-longitudinal-transverse stretching, it is preferable that transverse stretching is carried out in a temperature of 120-140° C. and a ratio of about 4.0-5.5 times. It is not preferable that the transverse stretching ratio is low beyond the foregoing range because strength (strength at 5% extension) in the transverse direction is too low to have a practical use, reversely, it is not preferable that the transverse stretching ratio is high beyond the foregoing range because thermal shrinkage in the transverse direction becomes high. Moreover, it is not preferable that temperature in transverse stretching is low beyond the foregoing range because distortion in boiling is too large to have a practical use, reversely, it is not preferable that temperature in transverse stretching is high beyond the foregoing range because strength (strength at 5% extension) in the transverse direction is too low to have a practical use.

Further, to obtain a film roll of the present invention, thermal fixation treatment after the longitudinal-longitudinal-transverse stretching is preferably conducted in a temperature of 180-230° C. When the temperature in the thermal fixation treatment is low beyond the foregoing range, it is not preferable because thermal shrinkage in the longitudinal direction and transverse direction is large, and reversely, when the temperature in the thermal fixation treatment is high beyond the foregoing range, it is not preferable because impact strength of biaxially stretched film becomes low.

In addition, to obtain a film roll of the present invention, relaxation treatment after thermal fixation is preferably carried out in a relaxation of 2-10%. When the relaxation treatment ratio is low beyond the foregoing range, it is not preferable because thermal shrinkage in the longitudinal direction and transverse direction becomes large, and reversely, when the relaxation treatment ratio is high beyond the foregoing range, it is not preferable because strength (strength at 5% extension) in the longitudinal direction and the width direction is too low to have a practical use.

Also, width of film roll is not particularly limited, but the lower limit of width of film roll is preferably 0.35 m or more from the point of easy handling, more preferably 0.50 m or more. On the other hand, the upper limit of width of film roll is preferably 2.5 m or less, more preferably 2.0 m or less, and further preferably 1.5 m or less. In addition, winding length is also not particularly limited, but the lower limit of width of film roll is preferably 500 m or more from the points of easy winding and easy handling, more preferably 1000 m or more. On the other hand, the upper limit of winding length of film roll is preferably 25000 m or less, more preferably 20000 m or less, and further preferably 15000 m or less. Additionally, in the case of film thickness of about 15 μm, 12000 m or less is particularly preferable. Also, winding core can ordinarily employ a paper, plastic or metal core with 3 inches, 6 inches, 8 inches and the like.

Moreover, thickness of film composing polyamide based film roll is also not particularly limited, for example, as a polyamide based film for packaging, 8-50 μm is preferable, 10-30 μm is further preferable.

In addition, polyamide based resin film composing a film roll of the present invention can contain various kinds of additives, within the range that the characteristics are not damaged, such as lubricant, anti-blocking agent, thermal stabilizer, antioxidant, antistatic agent, light resistant agent and impact modifier. In particular, it is preferable to contain various kinds of inorganic particles so as to improve lubrication of biaxially stretched film. In addition, as an inorganic particle, one with an average diameter of particle (i.e., average particle diameter) of 0.5-5.0 μm is preferable, and silica particle is particularly preferable. When the average particle diameter is below 0.5 μm, no good lubrication can be obtained, whereas when the average particle diameter is above 5 μm, it is not preferable because transparency become poor and so called strike through on printing occurs. Additionally, the average particle diameter can be measured by employing a method in which a weight-average diameter can be calculated from a particle distribution obtained by a coalter counter, it can be determined from the measurement of particles before addition to polyamide resin, and also can be determined from the measurement of particle separated by dissolving polyamide based resin film in acid. Also, an organic lubricant such as ethylene-bis-stearic acid exhibiting the effect of lowering surface energy is preferably added because lubrication of film composing a film roll becomes excellent.

Further, polyamide based resin film composing a film roll of the present invention can be subjected to thermal treatment or humidity adjusting treatment to improve the dimensional stability according to the applications. In addition, it can be provided with corona treatment, coating treatment or flame treatment to give better adhesion of film surface, and also processed by printing, deposition or the like.

Additionally, any particular one of the above-described measures (1) to (6) alone does not contribute to the reduction of variation in the physical properties of film roll, and we are considering that, by using a combination of measures (1) to (6), the variation in the physical properties of film roll can be very efficiently reduced.

EXAMPLES

The present invention will be described in detail with reference to Examples below, the present invention is not limited to the aspects of Examples, can be suitably modified to the extent not departing from the spirit of the present invention. Tables 1 and 2 each show features of feedstock chips A to E used in Examples and Comparative examples; compositions of feedstock chips used in Examples and Comparative examples; and film forming conditions of film rolls in Examples and Comparative examples. Additionally, chips A, C and D consist of 97.00% by weight of nylon 6 (relative viscosity=2.8, Tg=41° C.) and 3.00% by weight of silica particle; and chips B and E consist of 96.45% by weight of nylon 6 (relative viscosity=2.8, Tg=41° C.), 3.00% by weight of polymethaxyleneadipamide (relative viscosity=2.1), 0.15% by weight of ethylene-bis-stearamide and 0.40% by weight of silica particle. In addition, silica particle added to chips A and C has an average particle diameter of about 3.0

μm, silica particle added to chip B has an average particle diameter of about 1.8 μm, silica particle added to chips D and E has an average particle diameter of about 2.0 μm. Also, the shape of chips A to E are all elliptic cylinder, chip A and chip D, chip B and chip E have each the same length in major axis of cross section, minor axis of cross section and chip length.

chip (chip A) other than the polyamide based resin chip with the largest amount used comprises each its average major axis, average minor axis and average chip length within a range of ±20% relative to the average major axis, average minor axis and average chip length of the polyamide based resin chip with the largest amount used (chip B).

TABLE 1

| | Composition of resin etc. | | | Lubricant | | Shape (average: mm) | | |
|---|---|---|---|---|---|---|---|---|
| | Nylon 6 (% by weight) | Polymethaxyleneadipamide (% by weight) | Ethylene-bis-stearamide (% by weight) | Particle diameter (μm) | Amount added (% by weight) | Major axis of cross section | Minor axis of cross section | Chip length |
| Chip A | 97.00 | — | — | 3.0 | 3.00 | 2.4 | 2.2 | 2.1 |
| Chip B | 96.45 | 3.00 | 0.15 | 1.8 | 0.40 | 2.5 | 2.2 | 2.2 |
| Chip C | 97.00 | — | — | 3.0 | 3.00 | 4.5 | 2.2 | 4.8 |
| Chip D | 97.00 | — | — | 2.0 | 3.00 | 2.4 | 2.2 | 2.1 |
| Chip E | 96.45 | 3.00 | 0.70 | 2.0 | 0.40 | 2.5 | 2.2 | 2.2 |

TABLE 2

| | | | | | Film forming conditions | | | | | | | | |
|---|---|---|---|---|---|---|---|---|---|---|---|---|---|
| | Mixing ratio | Angle of | Water | Wind velocity of suction in | Temperature of | First longitudinal stretching | | Second longitudinal stretching | | Transverse stretching | | | |
| | of feedstock chips (% by weight) | slope of hopper (degree) | content of chip (ppm) | vacuum box (m/min.) | chip fed to hopper (° C.) | Temperature (° C.) | Ratio | Temperature (° C.) | Ratio | Temperature (° C.) | Ratio | Thermal fixation (° C.) | Relaxation Treatment (%) |
| Example 1 | A/B = 5/95 | 70 | 800 | 5.0 ± 0.5 | 91 | 85 | 2.1 | 70 | 1.6 | 130 | 4.0 | 210 | 5.0 |
| Example 2 | A/B = 5/95 | 70 | 800 | 5.0 ± 0.5 | 91 | 90 | 2.2 | 70 | 1.5 | 130 | 4.0 | 210 | 5.0 |
| Example 3 | A/B = 5/95 | 70 | 800 | 5.0 ± 0.5 | 91 | 85 | 2.1 | 70 | 1.6 | 130 | 3.6 | 215 | 3.0 |
| Example 4 | A/B = 15/85 | 70 | 800 | 5.0 ± 0.5 | 91 | 85 | 2.1 | 70 | 1.6 | 130 | 4.0 | 210 | 5.0 |
| Example 5 | D/E = 5/95 | 70 | 800 | 5.0 ± 0.5 | 91 | 85 | 2.1 | 70 | 1.6 | 130 | 4.0 | 210 | 5.0 |
| Example 6 | A/B = 5/95 | 65 | 800 | 5.0 ± 0.5 | 91 | 85 | 2.1 | 70 | 1.6 | 130 | 4.0 | 210 | 5.0 |
| Example 7 | A/B = 5/95 | 70 | 800 | 3.0 ± 0.5 | 91 | 85 | 2.1 | 70 | 1.6 | 130 | 4.0 | 210 | 5.0 |
| Comparative example 1 | A/B = 5/95 | 70 | 800 | 5.0 ± 0.5 | 91 | 90 | 1.5 | 70 | 2.2 | 130 | 4.0 | 210 | 5.0 |
| Comparative example 2 | C/B = 5/95 | 70 | 800 | 5.0 ± 0.5 | 91 | 85 | 2.1 | 70 | 1.6 | 130 | 4.0 | 210 | 5.0 |
| Comparative example 3 | A/B = 5/95 | 70 | 1500 | 5.0 ± 0.5 | 85 | 85 | 2.1 | 70 | 1.6 | 130 | 4.0 | 210 | 5.0 |
| Comparative example 4 | A/B = 5/95 | 70 | 800 | 5.0 ± 0.5 | 30 | 85 | 2.1 | 70 | 1.6 | 130 | 4.0 | 210 | 5.0 |
| Comparative example 5 | A/B = 5/95 | 70 | 800 | — | 91 | 85 | 2.1 | 70 | 1.6 | 130 | 4.0 | 210 | 5.0 |

Example 1

The above-described chips A and B were separately pre-dried while heating at about 120° C. for about 8.0 hours using a blender apparatus of 15 kl. Each chip was sampled from the blender by a predetermined amount and its water content was measured to find that chips A and B both had 800 ppm of water content. Additionally, the water content was measured under the conditions of sample weight of 1 g and sample heating temperature of 230° C. using a Karl Fisher moisture meter (MKC-210 manufactured by KYOTO Electronics Corp.).

Then, chips in each blender were separately supplied to a hopper just above an extruder continuously by a quantitative screw feeder. Additionally, the amount supplied of chip A was 5.0% by weight and the amount supplied of chip B was 95.0% by weight. The hopper had a capacity to accommodate feedstock chip of 150 kg, the discharge rate of extruder was 450 kg/hour. Also, the angle of slope of hopper was adjusted to 70°. Additionally, in Example 1, the polyamide based resin Also, on feeding chips A and B into a hopper, the chips were fed in a short period of time from drying to the hopper so that the temperature of chip in each blender did not become too low. The temperature of both chips A and B just before being fed into the hopper was about 91° C. Then, the chips A and B fed were blended in the hopper, melt-extruded through a T-die at 270° C. from a single screw type extruder, wound on a rotating metal roll chilled at 17° C. for quenching to give an unstretched film having a thickness of 257 μm. Additionally, take-up speed of unstretched film (rotational speed of metal roll) was about 60 m/min.

Also, air gap in winding melted resin on a metal roll was adjusted to 40 mm, by impressing a direct current negative charge of 100 mA at 11±1.1 kv with a needle electrode to yield glow discharge, melted resin was electrostatically attached closely on the metal roll. Further, in winding melted resin on a metal roll, the part contacting the melted resin with the metal roll was sucked over the entire width of melted resin using a vacuum box in the opposite direction to the direction of winding the resin to advance close contact of the melted resin on the metal roll. Additionally, the wind velocity of suction in the vacuum box was adjusted to be 5.0±0.5 m/sec. over the entire width of suction inlet (i.e., entire width of melted resin).

Thereafter, the resultant unstretched film was longitudinally stretched (first longitudinal stretching) in stretching temperature of about 85° C. and about 2.1 times by a Teflon roll, then longitudinally stretched (second longitudinal stretching) in stretching temperature of about 70° C. and about 1.6 times by a ceramic roll. Further, the longitudinal stretching sheet was continuously led to a tenter, transversely stretched at about 130° C. and 4.0 times, thermally fixed at about 210° C., subjected to transverse relaxation treatment of 5.0% and then cooled, by cutting the both edge parts to eliminate, thereby to form a biaxially stretched film of about 15 μm and 1000 m or more continuously and produce a mill roll. Additionally, the variation widths of film surface temperature when a film is produced continuously in 1000 m were within ±0.8° C. to the average temperature in the preheating step, ±0.6° C. to the average temperature in the stretching step and ±0.5° C. to the average temperature in the thermal treatment step. Further, the resultant mill roll was slit into 400 mm in width and 1000 m in length, and wound up on 3 inch paper tube to give two polyamide based film rolls (slit rolls). Then, using the two slit rolls thus obtained (namely, obtained from the same mill roll), the characteristics were evaluated in the following methods. Additionally, for the following measurements of BS (boiling water shrinkage percentage), BSx (maximum boiling water shrinkage percentage), BSd (directional difference of boiling water shrinkage percentage) and refraction index, sample films were prepared as follows: a first sample cutout portion was set up within 2 m from the winding end of film, sample cutout portions from a second to 10th were set up in approximately every 100 m from the first sample cutout portion, a 11th cutout portion was set up within 2 m from the winding start of film, and sample films were cut out from each of cutout portions from the first to the 11th. The evaluation results are shown in Tables 3 to 7. In showing the evaluation results, an average of values of each sample measured and variation range of values of each sample are shown for impact strength and laminate strength. Also, regarding S-shaped curl, the numbers of samples determined in each evaluation level and the total evaluation level of all samples are shown.

[Boiling Water Shrinkage Percentage]

A biaxially oriented polyamide based resin film (sample film) cut out from each of cutout portions of one slit roll was cut out in a square with a side of 21 cm, allowed to stand in an atmosphere of 23° C. and 65RH % for two hours or more. A circle of about 20 cm in diameter centered on this sample was drawn, a longitudinal direction (direction of film drawn out) was set to be 0°, liner lines passing to the center of circle were clockwise drawn at intervals of 15° in the direction of 0 to 165°, and diameter in each direction was measured as the length before treatment. Then, after the sample cut out was thermally treated in boiling water for 30 minutes, it was brought back and water attached on the surface was wiped out, dried in air, allowed to stand in an atmosphere of 23° C. and 65% RH for 2 hours or more, as described above, and the length of linear line drawn to each diametrical direction was measured as the length after treatment. Then, according to the foregoing formulas 1 to 5, the following values were measured, which were, the BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

Thereafter, the maximum and the minimum of the maximum boiling water shrinkage percentage (BSx) of all samples were obtained, a larger difference between either the maximum or the minimum and the average boiling water shrinkage percentage (BSax) was calculated, a ratio of which relative to the average boiling water shrinkage percentage (BSax) was calculated, and thereby a degree of variability in the maximum boiling water shrinkage percentage (BSx) relative to the average boiling water shrinkage percentage (BSax) was obtained. Also, the maximum and the minimum of the directional difference of boiling water shrinkage percentage (BSd) of all samples were obtained, a larger difference between either the maximum or the minimum and the average directional difference of boiling water shrinkage percentage (BSad) was calculated, a ratio of which relative to the average directional difference of boiling water shrinkage percentage (BSad) was calculated, and thereby a degree of variability in the directional difference of boiling water shrinkage percentage (BSd) relative to the average directional difference of boiling water shrinkage percentage (BSad) was obtained.

[Thickness Irregularity in the Longitudinal Direction]

A slit roll for measurement of thickness irregularity was prepared by slitting a slit roll in about 3 cm width over the entire length in the longitudinal direction. Then, the average thickness, the maximum thickness and the minimum thickness were obtained over the entire length in the longitudinal direction using a thickness irregularity measuring apparatus (wide range high sensitive electronic micrometer K-313A) manufactured by Anritsu Corp. Thereafter, from the following formula 7, a degree of variability in thickness over the entire length in the longitudinal direction was calculated as follows: a larger difference between either the maximum thickness or the minimum thickness and the average thickness was calculated, a ratio of which relative to the average thickness was calculated to give the degree of variability in thickness over the entire length in the longitudinal direction.

$$\text{Degree of variability in thickness} = |\text{maximum thickness or minimum thickness} - \text{average thickness}| / \text{average thickness} \qquad 7$$

[Refraction Index]

Using an "Abbe refractometer 4T type" manufactured by Atago Co., Ltd, each sample film cut out from each of cutout portions was allowed to stand in an atmosphere of 23° C. and 65RH % for 2 hours or more, then refraction index in the thickness direction (Nz) was measured. Also, the average refraction index of all samples was calculated, as shown in Table 6, the difference between either the maximum or the minimum of Nz in all samples and the average refraction index was calculated and a ratio of which relative to the average refraction index was calculated as a degree of variability.

[Impact Strength]

Each sample film cut out from each of cutout portions was allowed to stand in an atmosphere of 23° C. and 65RH % for 2 hours or more, then breaking strength was measured using a "Film impact tester TSS type" manufactured by Toyo Seiki Seisaku-Sho, Ltd. with hemispheric collision ball of 12.7 mm in diameter, and the strength was defined as impact strength. The average impact strength of all sample films was also calculated.

[Lamination Processability]

Using another slit roll (obtained from the same mill roll) different from a slit roll by which the above-described boiling water shrinkage percentage, thickness irregularity in the longitudinal direction, refraction index and impact strength were measured, a laminated film roll with a three layer laminated structure consisting of polyamide based resin/LDPE/LLDPE was obtained as follows: to a biaxially oriented polyamide resin film composing the slit roll, urethane based AC agent ("EL443" manufactured by Toyo-Morton, Ltd.) was coated, and then, on which LDPE (low density polyethylene) film of 15 μm in thickness was continuously extruded at 315° C. using a single test laminator apparatus manufactured by Modern Machinery Ltd., and further LLDPE (linear low density polyethylene) film of 40 μm in thickness was continuously laminated thereon. Also, processability in producing a laminated film roll was evaluated as the following three levels.

○: no wrinkle of roll occurs, so no need in adjustment of condition

Δ: wrinkle of roll eliminated by adjustment of condition x: wrinkle of roll still occurs in spite of any adjustment of condition

[Laminate Strength]

Also, a laminate film cut out from the laminate film roll was cut out in 15 mm wide and 200 mm long as a sample piece, and peel strength between polyamide based resin film layer and LDPE layer was measured under the conditions of temperature of 23° C. and relative humidity of 65% using "Tensiron UMT-II-500 type" manufactured by Toyo Boldwin Co. Ltd. Additionally, pulling rate was 10 cm/min., peeling angle was 180 degree, and the measurement was carried out with a peeling part immersed in water. Also, in the measurement of laminate strength, a first sample piece was cut out within 2 m from the winding end of laminate film roll, sample pieces of a second to 9th were cut out in approximately every 100 m from the first sample cutout portion, a 10th sample piece was cut out within 2 m from the winding start of film, and each sample piece from the first to the 10th was measured. The average of the measurements was also calculated.

[S-Shaped Curl Phenomenon]

As described above, the laminate film wound out as a laminate film roll was two folded parallel to the winding length direction while continuously conducting heat-sealing on each of both edges in 20 mm at 150° C. in the longitudinal direction using a test sealer manufactured by Nishibe Kikai Co. Ltd. Then, the film was intermittently heat-sealed at intervals of 150 mm in 10 mm in the perpendicular direction thereto to obtain a half-finished product with width of 200 mm. This product was cut in the winding length direction so that both edges have a sealed part of 10 mm, then cut at the boundary of the sealed part in the perpendicular direction thereto, and thereby to prepare a three-edge sealed bag (seal width: 10 mm). Of the three-edge sealed bags, the three-edge sealed bag prepared from the portion within 2 m from winding end of laminate film roll was selected as a first sample, and the three-edge sealed bags prepared from the portions being about 100, 200, . . . 900 m apart from the prepared portion of the first sample were selected as a second to 10th sample, respectively, and the three-edge sealed bag prepared from the portion within 2 m from winding start of laminate film roll was selected as a 11th sample. Thereafter, these eleven three-edge sealed bags were thermally treated in boiling water for 30 minutes, then allowed to stand in an atmosphere of 23° C. and 65RH % overnight, and further, the eleven three-edge sealed bags were overlapped, and 1 kg load was applied on the entire surface of bag from above, being kept overnight, and followed by removing the load. The degree of warpage of bag (S-shaped curl) was evaluated as follows.

⊚: no warpage at all

○: warpage is slightly observed x: warpage is apparently observed xx: remarkable warpage Example 2

An unstretched film obtained in the same manner as in Example 1 was longitudinally stretched (first longitudinal stretching) in stretching temperature of about 90° C. and about 2.2 times by a Teflon roll, and then longitudinally stretched (second longitudinal stretching) in stretching temperature of about 70° C. and about 1.5 times by a ceramic roll. Further, in the same manner as in Example 1, the longitudinally stretched sheet was continuously led to a stenter, and transversely stretched at about 130° C. and 4.0 times. Then, it was thermally fixed at about 210° C., subjected to transverse relaxation treatment of 5.0% and cooled. Then, by cutting the both edge parts to eliminate, a biaxially stretched film of about 15 μm and 1000 m or more continuously was formed. Additionally, the variation width of film surface temperature when the film was continuously produced was the same as in Example 1. The resultant film was slit and wound up in the same manner as in Example 1, to give polyamide based film rolls in Example 2. Then, the characteristics of the resultant film were evaluated in the same methods as in Example 1. The evaluation results are shown in Tables 3 to 7.

Example 3

An unstretched film obtained in the same manner as in Example 1 was longitudinally stretched in two stages in the same manner as in Example 1. Then, the longitudinally stretched sheet continuously led to a stenter, transversely stretched at about 130° C. and 3.6 times. Then, it was thermally fixed at about 215° C., subjected to transverse relaxation treatment of 3.0% and cooled. Then, by cutting the both edge parts to eliminate, a biaxially stretched film of about 15 μm and 1000 m or more continuously was formed. Additionally, the variation width of film surface temperature when the film was produced was the same as in Example 1. The resultant film was slit and wound up in the same manner as in Example 1, to give polyamide based film rolls in Example 3. Then, the characteristics of the resultant film roll were evaluated in the same methods as in Example 1. The evaluation results are shown in Tables 3 to 7.

Example 4

A polyamide based film roll in Example 4 was obtained in the same manner as in Example 1 except that the mixing ratio of feedstock chip A and feedstock chip B was set in chip A of 15.0% by weight and chip B of 85.0% by weight. Additionally, also in Example 4, the polyamide based resin chip (chip A) other than the polyamide based resin chip with the largest amount used comprises each its average major axis, average minor axis and average chip length within a range of ±20% relative to the average major axis, average minor axis and average chip length of the polyamide based resin chip with the largest amount used (chip B). Then, the characteristics of the resultant film roll were evaluated in the same methods as in Example 1. The evaluation results are shown in Tables 3 to 7.

Example 5

A polyamide based film roll in Example 5 was obtained in the same manner as in Example 1 except that feedstock chips D and E were used instead of feedstock chips A and B, respectively, namely in Example 5, a polyamide based film roll was produced using chip D of 5.0% by weight and chip E of 95.0% by weight. Additionally, also in Example 5, the polyamide based resin chip (chip D) other than the polyamide based resin chip with the largest amount used comprises each its average major axis, average minor axis and average chip length within a range of ±20% relative to the average major axis, average minor axis and average chip length of the polyamide based resin chip with the largest amount used (chip E). Then, the characteristics of the resultant film roll were evaluated in the same methods as in Example 1. The evaluation results are shown in Tables 3 to 7.

Example 6

A polyamide based film roll in Example 6 was obtained in the same manner as in Example 1 except that an angle of slope of hopper was changed to 65° on supplying feedstock chip in a blender into a hopper just above an extruder. Then, the characteristics of the resultant film roll were evaluated in the same methods as in Example 1. The evaluation results are shown in Tables 3 to 7.

Example 7

A polyamide based film roll in Example 7 was obtained in the same manner as in Example 1 except that wind velocity of suction in a vacuum box was adjusted to 3.0±0.5 m/sec. over the entire width of suction inlet in winding melted resin on a metal roll. Then, the characteristics of the resultant film roll were evaluated in the same methods as in Example 1. The evaluation results are shown in Tables 3 to 7.

Comparative Example 1

An unstretched film obtained in the same manner as in Example 1 was longitudinally stretched (first longitudinal stretching) in stretching temperature of about 90° C. and about 1.5 times by a Teflon roll, then longitudinally stretched (second longitudinal stretching) in stretching temperature of about 70° C. and about 2.2 times by a ceramic roll. Further, the longitudinally stretched sheet was continuously led to a stenter, in the same manner as in Example 1, transversely stretched, thermally fixed, subjected to transverse relaxation treatment and cooled. Then, by cutting the both edge parts to eliminate, a biaxially stretched film of about 15 μm and 1000 m or more continuously was formed. Additionally, the variation width of film surface temperature when the film was continuously produced was the same as in Example 1. The resultant film was slit and wound up in the same manner as in Example 1, to give polyamide based film rolls in Comparative example 1. Then, the characteristics of the resultant film roll were evaluated in the same methods as in Example 1. The evaluation results are shown in Tables 3 to 7.

Comparative Example 2

A polyamide based film roll in Comparative example 2 was obtained in the same manner as in Example 1 except that feedstock chip C was used instead of feedstock chip A. Additionally, in Comparative example 2, the polyamide based resin chip (chip C) other than the polyamide based resin chip with the largest amount used comprises each its average major axis, average minor axis and average chip length outside the range of ±20% relative to the average major axis, average minor axis and average chip length of the polyamide based resin chip with the largest amount used (chip B). Then, the characteristics of the resultant film roll were evaluated in the same methods as in Example 1. The evaluation results are shown in Tables 3 to 7.

Comparative Example 3

A polyamide based film roll in Comparative example 3 was obtained in the same manner as in Example 1 except that pre-drying condition of feedstock chips A and B was changed to a method of heating at about 100° C. for about 4.0 hours. Additionally, a predetermined amount of each chip was sampled from a blender after pre-drying, water content was measured, which showed that the water contents of chips A and B were both 1500 ppm, and the temperatures of chips A and B just before being fed were both at about 85° C. Then, the characteristics of the resultant film roll were evaluated in the same methods as in Example 1. The evaluation results are shown in Tables 3 to 7.

Comparative Example 4

A polyamide based film roll in Comparative example 4 was obtained in the same manner as in Example 1 except that feedstock chips A and B were allowed to stand in each of blenders after pre-drying for about 5 hours before being fed into a hopper just above an extruder. Additionally, the water contents of chips A and B were both 800 ppm just before being fed to a hopper, and the temperatures of chips A and B just before being fed to a hopper were both about 30° C. Then, the characteristics of the resultant film roll were evaluated in the same methods as in Example 1. The evaluation results are shown in Tables 3 to 7.

Comparative Example 5

A polyamide based film roll in Comparative example 5 was obtained in the same manner as in Example 1 except that no suction was conducted by a vacuum box in winding melted resin on a metal roll. Then, the characteristics of the resultant film roll were evaluated in the same methods as in Example 1. The evaluation results are shown in Tables 3 to 7.

TABLE 3

| | Characteristics of polyamide film roll | | |
|---|---|---|---|
| | Average boiling water shrinkage percentage (BSax: %) | Maximum or minimum of maximum boiling water shrinkage percentage of all samples (%) | Degree of variability in maximum boiling water shrinkage percentage to average boiling water shrinkage percentage* (%) |
| Example 1 | 4.2 | 4.5 | 7.1 |
| Example 2 | 3.8 | 4.1 | 7.9 |
| Example 3 | 3.2 | 3.0 | 6.3 |
| Example 4 | 3.5 | 3.7 | 5.7 |
| Example 5 | 4.0 | 4.3 | 7.5 |
| Example 6 | 4.0 | 3.7 | 7.5 |
| Example 7 | 5.1 | 5.5 | 7.8 |

TABLE 3-continued

Characteristics of polyamide film roll

| | Average boiling water shrinkage percentage (BSax: %) | Maximum or minimum of maximum boiling water shrinkage percentage of all samples (%) | Degree of variability in maximum boiling water shrinkage percentage to average boiling water shrinkage percentage* (%) |
|---|---|---|---|
| Comparative example 1 | 5.0 | 4.6 | 8.0 |
| Comparative example 2 | 5.7 | 5.1 | 10.5 |
| Comparative example 3 | 6.3 | 6.9 | 9.5 |
| Comparative example 4 | 5.5 | 5.0 | 9.1 |
| Comparative example 5 | 4.2 | 4.7 | 11.9 |

*Degree of variability in maximum boiling water shrinkage percentage to average boiling water shrinkage percentage:
Degree of variability was calculated as a larger difference between either the maximum or the minimum of maximum boiling water shrinkage percentage of all samples and the average boiling water shrinkage percentage.

TABLE 4

Characteristics of polyamide film roll

| | Average directional difference of boiling water shrinkage percentage (BSad: %) | Maximum or minimum of directional difference of boiling water shrinkage percentage of all samples (%) | Degree of variability in directional difference of boiling water shrinkage percentage to average directional difference of boiling water shrinkage percentage* (%) |
|---|---|---|---|
| Example 1 | 1.2 | 1.3 | 8.3 |
| Example 2 | 1.4 | 1.5 | 7.1 |
| Example 3 | 1.4 | 1.5 | 7.1 |
| Example 4 | 1.1 | 1.0 | 9.1 |
| Example 5 | 1.1 | 1.0 | 9.1 |
| Example 6 | 1.3 | 1.4 | 7.7 |
| Example 7 | 1.4 | 1.3 | 7.1 |
| Comparative example 1 | 1.6 | 1.4 | 12.5 |
| Comparative example 2 | 1.3 | 1.5 | 15.4 |
| Comparative example 3 | 1.8 | 1.6 | 11.1 |
| Comparative example 4 | 1.5 | 1.7 | 13.3 |
| Comparative example 5 | 1.7 | 1.9 | 11.8 |

*Degree of variability in directional difference of boiling water shrinkage percentage to average directional difference of boiling water shrinkage percentage:
Degree of variability was calculated as a larger difference between either the maximum or the minimum of directional difference of boiling water shrinkage percentage of all samples and the average directional difference of boiling water shrinkage percentage.

TABLE 5

Characteristics of polyamide film roll

| | Average thickness (μm) | Maximum or minimum of thickness over the entire length (μm) | Degree of variability in thickness to average thickness* (%) |
|---|---|---|---|
| Example 1 | 15.03 | 15.80 | 5.1 |
| Example 2 | 15.05 | 15.82 | 5.1 |
| Example 3 | 15.03 | 15.75 | 4.8 |
| Example 4 | 15.05 | 16.05 | 6.6 |
| Example 5 | 15.05 | 15.64 | 3.9 |
| Example 6 | 15.04 | 16.18 | 7.6 |
| Example 7 | 15.04 | 16.24 | 8.0 |
| Comparative example 1 | 15.05 | 17.32 | 15.1 |
| Comparative example 2 | 15.05 | 15.99 | 6.2 |
| Comparative example 3 | 15.03 | 13.75 | 8.6 |
| Comparative example 4 | 15.05 | 13.51 | 10.2 |
| Comparative example 5 | 15.05 | 16.92 | 12.4 |

*Degree of variability in thickness to average thickness:
Degree of variability was calculated as a larger difference between either the maximum or the minimum of thickness over the entire length and the average thickness.

TABLE 6

Characteristics of polyamide film roll

| | Average refraction index (Nz) | Maximum or minimum of refraction indexes of all samples | Degree of variability in refraction index to average refraction index* (%) |
|---|---|---|---|
| Example 1 | 1.510 | 1.518 | 0.5 |
| Example 2 | 1.512 | 1.505 | 0.5 |
| Example 3 | 1.514 | 1.508 | 0.4 |
| Example 4 | 1.510 | 1.518 | 0.5 |
| Example 5 | 1.510 | 1.515 | 0.3 |
| Example 6 | 1.512 | 1.519 | 0.5 |
| Example 7 | 1.510 | 1.519 | 0.6 |
| Comparative example 1 | 1.511 | 1.494 | 1.1 |
| Comparative example 2 | 1.511 | 1.519 | 0.5 |
| Comparative example 3 | 1.508 | 1.517 | 0.6 |
| Comparative example 4 | 1.512 | 1.523 | 0.7 |
| Comparative example 5 | 1.510 | 1.525 | 1.0 |

*Degree of variability in refraction index to average refraction index:
Degree of variability was calculated as a larger difference between either the maximum or the minimum of refraction indexes of all samples and the average refraction index.

TABLE 7

Evaluation result

| | S-shaped curl | | Impact strength (kg/cm) | | Laminate strength (g/15 mm) | | Lamination processability |
|---|---|---|---|---|---|---|---|
| | Total | Sample numbers each of ◉, ○, X | Average | Variation range | Average | Variation range | |
| Example 1 | ◉ | ◉ ... 10, ○ ... 1 | 11.4 | 10.6~12.0 | 200 | 190~210 | ○ |
| Example 2 | ○ | ◉ ... 4, ○ ... 7 | 10.7 | 10.1~11.3 | 210 | 200~220 | ○ |
| Example 3 | ◉ | ◉ ... 11 | 13.8 | 12.9~14.2 | 300 | 280~320 | ○ |
| Example 4 | ◉ | ◉ ... 10, ○ ... 1 | 10.2 | 9.9~10.6 | 200 | 180~220 | ○ |
| Example 5 | ◉ | ◉ ... 10, ○ ... 1 | 11.2 | 10.8~11.9 | 200 | 180~210 | ○ |

TABLE 7-continued

| | S-shaped curl | | Impact strength (kg/cm) | | Laminate strength (g/15 mm) | | |
|---|---|---|---|---|---|---|---|
| | Total | Sample numbers each of ⊚, ○, X | Average | Variation range | Average | Variation range | Lamination processability |
| Example 6 | ⊚ | ⊚...9, ○...2 | 10.8 | 10.2~11.5 | 230 | 220~240 | ○ |
| Example 7 | ⊚ | ⊚...7, ○...4 | 10.9 | 10.4~11.5 | 230 | 220~240 | ○ |
| Comparative example 1 | X | ⊚...1, ○...3, X...7 | 11.5 | 10.2~12.8 | 200 | 150~220 | X |
| Comparative example 2 | ○ | ⊚...2, ○...9 | 11.0 | 10.1~12.5 | 200 | 170~250 | Δ |
| Comparative example 3 | X | ○...2, X...9 | 10.5 | 9.5~11.2 | 210 | 170~240 | Δ |
| Comparative example 4 | X | ⊚...1, ○...4, X...6 | 11.2 | 10.3~12.6 | 230 | 170~260 | X |
| Comparative example 5 | X | ○...3, X...8 | 11.3 | 10.5~13.2 | 220 | 180~280 | Δ |

Effect of Film in Examples

It is known from Tables 3 to 7 that all the film rolls of Examples 1 to 7 have a very small thickness irregularity over the entire roll in the longitudinal direction, a small variation of physical properties such as boiling water shrinkage percentage and refraction index. Also, it is known that all such film rolls of Examples 1 to 7 having a small variation of physical properties such as boiling water shrinkage percentage and refraction index undergo no S-shaped curl phenomenon and have an excellent lamination processability. Moreover, it is known that the films composing film rolls of Examples 1 to 7 are good in impact strength (toughness and pinhole resistance) and high in laminate strength. In contrast, it is known that film rolls of Comparative examples 1 to 5 have a large thickness irregularity over the entire roll in the longitudinal direction, a large variation of physical properties such as boiling water shrinkage percentage and refraction index, S-shaped curl phenomenon is observed, and lamination processability is poor.

INDUSTRIAL APPLICABILITY

A polyamide based resin film roll of the present invention can be preferably used in an application of retort processing for food since it has excellent processability as described above.

The invention claimed is:

1. A film roll wound up of a polyamide based resin film in a width of 0.2 m or more, 3.0 m or less, and a length of 300 m or more, 30000 m or less,
   wherein when a first sample cutout portion is set up within 2 m from the winding end of film, a final cutout portion is set up within 2 m from the winding start of film, and a sample cutout portion is set up in approximately every 100 m from the first sample cutout portion, the following requirements are satisfied:
   (1) when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage of the maximum boiling water shrinkage percentages is 3% to 6%, and a degree of variability in the maximum boiling water shrinkage percentages of all samples is within ±2% to ±10% relative to the average boiling water shrinkage percentage;
   (2) when a directional difference of boiling water shrinkage percentage of each sample cut out from each of the cutout portions is measured, the directional difference of boiling water shrinkage percentage being the difference between a boiling water shrinkage percentage in the direction of +45° to the longitudinal direction and a boiling water shrinkage percentage in the direction of −45° to the longitudinal direction in an absolute value, an average directional difference of boiling water shrinkage percentage which is the average of the directional differences of boiling water shrinkage percentage is 1.5% or less, and a degree of variability in the directional differences of boiling water shrinkage percentage of all samples is within ±2% to ±10% relative to the average directional difference of boiling water shrinkage percentage;
   (3) a degree of variability in the film thickness of a roll wound up over the entire length in the longitudinal direction is within ±2% to ±10% relative to the average thickness.

2. The polyamide based resin film roll described in claim 1, wherein when refraction index in the thickness direction of each sample cut out from each of the cutout portions is measured, an average refraction index which is the average of the refraction indexes is 1.505 or more, 1.520 or less, and a degree of variability in the refraction indexes of all samples is within ±2% relative to the average refraction index.

3. The polyamide based resin film roll described in claim 1, wherein when refraction index in the thickness direction of each sample cut out from each of the cutout portions is measured, an average refraction index which is the average of the refraction indexes is 1.505 or more, 1.520 or less, and a degree of variability in the refraction indexes of all samples is within ±1% relative to the average refraction index.

4. The polyamide based resin film roll described in claim 1, wherein the major component of polyamide composing the polyamide based resin film is nylon 6.

5. The polyamide based resin film roll described in claim 1, which is a polyamide based resin film wound up being formed from a mixture of two or more kinds of different polyamide resins.

6. The polyamide based resin film roll described in claim 1, wherein the polyamide based resin film wound up is laminated with a polyolefin based resin film.

7. The polyamide based resin film roll described in claim 1, which is a polyamide based resin film wound up wherein an unoriented sheet-like material obtained by extruding melted polyamide based resin from a T-die and cooling by contact with a metal roll is stretched biaxially.

8. The polyamide based resin film roll described in claim 1, which is a polyamide based resin film wound up being stretched by a tenter stretching method.

9. The polyamide based resin film roll described in claim 1, which is a polyamide based resin film wound up being sequentially biaxially stretched.

10. The polyamide based resin film roll described in claim 1, which is a polyamide based resin film wound up being biaxially stretched in the longitudinal direction and the transverse direction.

11. The polyamide based resin film roll described in claim 1, which is a polyamide based resin film wound up wherein an essentially unoriented sheet-like material of polyamide based resin is stretched in at least two stages in the longitudinal direction in threefold or more at a higher temperature than the glass transition temperature of the polyamide based resin plus 20° C., then stretched in the transverse direction in threefold or more.

12. The polyamide based resin film roll described in claim 1, which is a polyamide based resin film wound up being thermally fixed after a final stretching treatment.

13. The polyamide based resin film roll described in claim 1, which is a polyamide based resin film wound up being relaxed after thermal fixation.

14. The polyamide based resin film roll described in claim 1, wherein at least one kind selected from the group consisting of lubricant, anti-blocking agent, thermal stabilizer, antioxidant, antistatic agent, light resistant agent and impact modifier is added to the polyamide based resin film wound up.

15. The polyamide based resin film roll described in claim 1, wherein inorganic particle is added to the polyamide based resin film wound up.

16. The polyamide based resin film roll described in claim 1, wherein the inorganic particle is a silica particle of 0.5-5.0 μm in an average diameter.

17. The polyamide based resin film roll described in claim 1, wherein a higher fatty acid is added to the polyamide based resin film wound up.

18. A production method of the polyamide based resin film roll described in claim 1, comprising: a step of film forming while melt-extruding polyamide based resin chip; a step of biaxial stretching wherein an unstretched film obtained in the step of film forming is stretched biaxially in the longitudinal direction and the transverse direction; and a step of roll forming by winding up the biaxially stretched film to form the polyamide based resin film roll described in claim 1, wherein the step of biaxial stretching includes a two-stage stretching in the longitudinal direction before a stretching in the transverse direction.

19. The production method described in claim 18, wherein the stretching ratio in the first stage of two-stage stretching in the longitudinal direction in the step of biaxial stretching is higher than the stretching ratio in the second stage.

20. The production method described in claim 18, wherein the step of film forming comprises melt extrusion after polyamide based resin chip with the largest amount used is mixed with one or more kinds of polyamide based resin chips different from the polyamide based resin chip in composition,
wherein the shape of each polyamide based resin chip used is elliptic cylinder having elliptic cross section with a major axis, a minor axis, and a polyamide based resin chip other than the polyamide based resin chip with the largest amount used is adjusted each in its average major axis, average minor axis and average chip length so as to be within a range of ±20% relative to the average major axis, average minor axis and average chip length of the polyamide based resin chip with the largest amount used.

21. The production method described in claim 18, comprising a step of melt extrusion using an extruder equipped with a funnel-shaped hopper as a feed section of feedstock chip, wherein an angle of slope of the hopper is adjusted to 65° or more.

22. The production method described in claim 18, comprising a step of melt extrusion using an extruder equipped with a funnel-shaped hopper as a feed section of feedstock chip, wherein a water content of polyamide based resin chip before being fed to the hopper is adjusted to 800 ppm or more, and 1000 ppm or less.

23. The production method described in claim 18, comprising a step of melt extrusion using an extruder equipped with a funnel-shaped hopper as a feed section of feedstock chip, wherein a temperature of polyamide based resin chip before being fed to the hopper is adjusted to 80° C. or more.

24. The production method described in claim 18, wherein the step of film forming includes a cooling step of winding up melted resin extruded from an extruder on a cooling roll,
wherein a part contacting the melted resin with the surface of cooling roll is sucked over the entire width of melted resin by a suction unit in the opposite direction to the winding up direction.

25. The production method described in claim 18, comprising a step of preheating conducted before a step of longitudinal stretching and a step of thermal treatment conducted after the step of longitudinal stretching,
wherein a variation width of surface temperature of film at any point in the step of longitudinal stretching, the step of preheating and the step of thermal treatment is adjusted over the entire film length within a range of ±1° C. to the average temperature.

* * * * *